Patented Apr. 13, 1948

2,439,532

UNITED STATES PATENT OFFICE 2,439,532

ANTHELMINTIC COMPOSITIONS

John A. Whiting and David V. Whitney, Jr., Kansas City, Mo., assignors to Armour and Company, Chicago, Ill., a corporation of Illinois No Drawing. Application December 23, 1943, Serial No. 515,371

5 Claims. (Cl. 167—53)

This invention relates to anthelmintic compositions and processes for their preparation. More particularly, it deals with such compositions which are suitable for administration to sheep and which will be readily taken by the sheep animals. Sheep animals are subject to infestation with internal parasites as are cattle and other animals, but it is very difficult to administer anthelmintics of ordinary types to sheep. The use of a drench or capsules for forcing anthelmintics down the throat of the sheep animal is not practical, and so far as we are aware there has never been available an anthelmintic composition which the sheep animal will eat voluntarily. Sheep are very fastidious animals and ordinarily when an anthelmintic substance is placed in their feed they will not eat and after smelling the feed which has been so treated will actually starve themselves before they will eat of it.

We have now discovered that an anthelmintic substance may be incorporated with a material commonly known as dried brewer's grain in such a way that the resulting product may be easily fed to sheep. The sheep relish this product and will eat it voluntarily, consuming any reasonable portions that are fed to them. In this way effective amounts of anthelmintic substances may be administered to the sheep without inconvenience and without any need for special implements, syringes, or the like.

Our improved composition may be prepared by intimately mixing the anthelmintic substance with the dried brewer's grain and, preferably, an adhesive material is mixed in to hold the anthelmintic to the surfaces of the brewer's grain.

The brewer's grain material is normally obtained as a result of brewing operations wherein grain such as barley, wheat, hops, etc., is digested by yeasts, the digest heated and distilled, and the grain residue dried. The dried brewer's grain so obtained resembles small hulls, contains no substantial nutriment value, and is very hard to digest.

The anthelmintic substance which is mixed with the dried brewer's grain may be a solution or suspension of any of the common anthelmintics, such as nicotine, phenothiazine, etc. Preferably the anthelmintic substance should be the composition more fully described in the copending application of John A. Whiting, Serial No. 439,401 filed April 17, 1942, Patent No. 2,428,444 and comprising nicotine, phenothiazine, bentonite, and copper sulphate.

The adhesive substance used in the preferred practice of the invention is a substance which will serve to bind the anthelmintic substance to the surfaces of the dried brewer's grain. The word "adhesive" as referred to herein is used in its broader sense and is not limited to such materials as glue, pastes, etc. A hydrocarbon oil is a good material to use as an adhesive in the practice of this invention, and other oils such as vegetable and animal oils may be used. Any non-poisonous material of sticky nature which will, due to the characteristic, serve to hold the anthelmintic to the filmy surfaces of the grain could be used.

In preparing the improved composition, the dried brewer's grain may be placed in a mechanical mixer and the liquid anthelmintic substance added, the stirring being continued until there is thorough dispersion of the anthelmintic throughout the mass. Considering the nicotine-phenothiazine-bentonite-copper sulphate suspension, the amount may be satisfactory in the neighborhood of 450 or 500 lbs. to each 1200 lbs. of dried brewer's grain. Suitably the nicotine-phenothiazine-bentonite-copper sulphate suspension may include the following ingredients in the amounts or proportions given:

| | | |
|---|---|---|
| Nicotine sulphate | grains | 8 |
| Copper sulphate | do | 20 |
| Bentonite | do | 20 |
| Phenothiazine | do | 194 |
| Water | fl. oz | 5/8 |

As specifically set forth in the copending application, Serial No. 439,401, the suspension may be prepared by mixing the nicotine substance, water and copper sulphate, separately mixing the phenothiazine and bentonite, and then mixing the two mixtures together.

Although thoroughly mixed with the dried brewer's grain, the anthelmintic substance in itself will not adhere well and has a tendency to pass through to the bottom portion of the container when the composition is being fed. This tendency is overcome by the addition of an adhesive material such as the hydrocarbon oil. This adhesive may be added as soon as the anthelmintic substance is thoroughly mixed in, and the mixing may then be continued until the adhesive is thoroughly distributed and in contact with all parts of the mass. As to the amount of the adhesive material required, it is satisfactory to use about 20 gallons of the hydrocarbon oil to about 1200 lbs. of the dried brewer's grain.

A specific example of the practice of the invention is given as follows:

193 pounds of phenothiazine are mixed with 40 pounds of bentonite, and 20 pounds of nicotine sulphate (40% aqueous solution) are mixed with water to which 20 pounds copper sulphate has been added. The two mixtures are mixed together and added to 1177 pounds of dried brewer's grain. When this is thoroughly mixed, 20 gallons of hydrocarbon oil is added thereto and mixed in. The hydrocarbon oil is Sinclair "No. 1 Paraffin Oil," having a viscosity of 150 Saybolts. The product so prepared is fed to sheep in troughs or other suitable containers and the sheep eat it with relish.

According to a modified procedure, the phenothiazine, copper sulphate, nicotine sulphate, and bentonite are mixed together in a dry mixture and this dry mixture is added to and intimately mixed with the brewer's grain. Then the water is added to the brewer's grain mixture and after the water is thoroughly incorporated, the oil is then added and thoroughly mixed in.

We do not know just what it is about the brewer's grain anthelmintic composition which is pleasing to the sheep animals' taste but can report the observation that the sheep will continue to eat this material whereas they refuse to eat other materials in which anthelmintic substances are incorporated.

In addition to the fact that sheep relish the improved composition, it has the advantage of carrying the vermicide properties far into the intestinal tract. The dried brewer's grains are very difficult to digest, being substantially undigestible, and pass through the stomachs of the animal and well through the intestines before the anthelmintic substances are all released so that there is good contact with the various intestinal parasites. Thus, the effect of the anthelmintic is enhanced especially as to those parasites in the lower part of the alimentary tract which could not be reached by ordinary anthelmintic compositions.

The foregoing detailed description has been given for purposes of explanation only, it being understood that the invention is subject to wide variation and many changes may be made all within the spirit of the invention.

What we claim as new and desire to procure in Letters Patent is:

1. An anthelmintic composition for sheep comprising dried brewer's grain and an anthelmintic substance mixed with said grain.

2. An anthelmintic composition for sheep comprising dried brewer's grain, an anthelmintic substance mixed with said grain, and an adhesive for holding said anthelmintic substance to the surfaces of said grain.

3. An anthelmintic composition for sheep comprising dried brewer's grain, an anthelmintic substance in admixture with said grain, and an oil coating the surfaces of said grain and binding said anthelmintic substance thereto.

4. An anthelmintic composition comprising dried brewer's grain, and an anthelmintic substance in admixture with said grain, said substance including nicotine phenothiazine bentonite and copper sulphate.

5. An anthelmintic composition for sheep comprising dried brewer's grain, an anthelmintic substance in admixture with said grain, said substance including nicotine phenothiazine bentonite and copper sulphate, and a hydrocarbon oil coating the surfaces of said brewer's grain and binding said substance thereto.

JOHN A. WHITING.
DAVID V. WHITNEY, Jr.

REFERENCES CITED

The following references are of record in the file of this patent:

UNITED STATES PATENTS

| Number | Name | Date |
| --- | --- | --- |
| 312,593 | Wiesebrock | Feb. 17, 1885 |
| 353,017 | Cadwell | Nov. 23, 1886 |
| 355,257 | Dieterichs | Dec. 28, 1886 |
| 1,839,970 | Konantz | Jan. 5, 1932 |
| 2,033,495 | Taylor | Mar. 10, 1936 |
| 2,033,856 | Smith | Mar. 10, 1936 |
| 2,096,566 | Smith | Oct. 19, 1937 |
| 2,146,867 | Welin | Feb. 14, 1939 |
| 2,277,680 | Bosquet | Mar. 31, 1942 |
| 2,294,888 | Austin | Sept. 8, 1942 |

OTHER REFERENCES

Roberts—Journal of the Council of Scientific and Industrial Research, Aug. 1939 (Australia), vol. 12, page 208 (167–53).

Carlson—Veterinary Medicine, vol. 34, page 48 (1939). (Dept. of Agriculture Lib.)